United States Patent
Agarwal

(10) Patent No.: US 7,163,670 B2
(45) Date of Patent: Jan. 16, 2007

(54) MEMBRANE FOR HYDROGEN RECOVERY FROM STREAMS CONTAINING HYDROGEN SULFIDE

(75) Inventor: Pradeep K. Agarwal, deceased, late of Laramie, WY (US); by John Ackerman, legal representative, Laramie, WY (US)

(73) Assignee: University of Wyoming

( * ) Notice: Subject to any disclaimer, the term of this patent is extended or adjusted under 35 U.S.C. 154(b) by 0 days.

(21) Appl. No.: 11/002,612

(22) Filed: Dec. 2, 2004

(65) Prior Publication Data
US 2006/0120948 A1 Jun. 8, 2006

Related U.S. Application Data

(63) Continuation of application No. PCT/US2003/17353, filed on Jun. 2, 2003.

(60) Provisional application No. 60/385,520, filed on Jun. 4, 2002.

(51) Int. Cl.
- C01B 3/02 (2006.01)
- C01B 17/04 (2006.01)
- B01D 53/22 (2006.01)
- B01D 61/00 (2006.01)
- B01D 71/02 (2006.01)

(52) U.S. Cl. .............. 423/573.1; 423/648.1; 96/4; 96/11; 204/164

(58) Field of Classification Search .......... 423/648.1, 423/573.1; 96/4, 11; 204/164

See application file for complete search history.

(56) References Cited

U.S. PATENT DOCUMENTS

| | | | |
|---|---|---|---|
| 5,096,683 A * | 3/1992 | Kriebel et al. | 423/248 |
| 5,211,923 A | 5/1993 | Harkness et al. | 423/220 |
| 5,306,476 A * | 4/1994 | Jalan et al. | 423/220 |
| 5,738,708 A | 4/1998 | Peachey et al. | 95/56 |
| 2002/0023538 A1 | 2/2002 | Agarwal et al. | 95/108 |
| 2004/0141910 A1 * | 7/2004 | Vizoso | 423/573.1 |

OTHER PUBLICATIONS

"Metal Sandwich Membrane Improves Hydrogen Separation and Production and is Economic to Fabricate", Mat. Tech. 1996 11:1-15, pp. 5-6.

Cox, Bernie G. et al, "Economics of Thermal Dissociation of $H_2S$ to Produce Hydrogen", Int. J. Hydrogen Energy, vol. 23, No. 7, pp. 531-554.

Busnyuk; A. et al, "Membrane Bias Effects on Plasma-Driven Permeation of Hydrogen Through Niobium Membrane", Journal of Nuclear Materials 290-293 (2001) pp. 57-60.

Buxbaum, Robert E. et al, "Hydrogen Transport Through Tubular Membranes of Palladium-Coated Tantalum and Niobium", Ind. Eng. Chem. Res. 1996, pp. 530-537.

Doroshin, A. Yu et al, "Interaction of Hydrogen Atoms with Palladium Surfaces Passivated by Adsorbed Sulfur Layers", Phys. Chem. Mech. Surfaces. vol. 4 (8), 1987, pp. 2321-2330.

(Continued)

*Primary Examiner*—Timothy C. Vanoy
(74) *Attorney, Agent, or Firm*—Emery L. Tracy

(57) ABSTRACT

A membrane for hydrogen recovery from streams containing hydrogen sulfide is provided. The membrane comprises a substrate, a hydrogen permeable first membrane layer deposited on the substrate, and a second membrane layer deposited on the first layer. The second layer contains sulfides of transition metals and positioned on the on a feed side of the hydrogen sulfide stream. The present invention also includes a method for the direct decomposition of hydrogen sulfide to hydrogen and sulfur.

16 Claims, 1 Drawing Sheet

Configuration of the composite membrane

OTHER PUBLICATIONS

Edlund, David J. et al, "Catalytic Platinum-Based Membrane Reactor for Removal of $H_2S$ From Natural Gas Streams", Journal of Membrane Science. 94 (1994), pp. 111-119.

Edlund, David J. et al, "Thermolysis of Hydrogen Sulfide in a Metal-Membrane Reactor", Journal of Membrane Science, 77 (1993) pp. 255-264.

Edlund, David et al, "Hydrogen-Permeable Metal Membranes for High-Temperature Gas Separations", 6 pages.

Fan, Jun et al, "Analysis of a Two-Stage Membrane Reactor Integrated with Porous Membrane Having Knudsen Diffusion Characteristics for the Thermal Decomposition of Hydrogen Sulfide", Journal of Membrane Science 166 (2000) 239-247.

Fukuda, K. et al, "Catalytic Decomposition of Hydrogen Sulfide", Ind. Eng. Chem. Fundam., vol. 17, No. 4, 1978, pp. 243-248.

Haas, L.A. et al, "Decomposition of Hydrogen Sulfide in an Electrical Discharge", Report of Invest. 7780, U.S. Dept. of Interior, 1973, pp. 1-22.

Glazunov, G.P., "Hydrogen Permeation Through Palladium After Hydrogen-Thermal Treatment and Exposure to a Plasma of Glow Discharge in Hydrogen, Helium and Argon", Int. J. Hydrogen Energy, vol. 22, No. 2/3, pp. 263-268, 1997.

Harkness, John B.L. et al, "Hydrogen Sulfide Waste Treatment by Microwave Plasma Dissociation", Proceedings of the 25th Intersociety Energy Conversion Engineering Conference—IECEC 1990, pp. 197-201.

Helfritch, Dennis, "Pulsed Corona Discharge for Hydrogen Sulfide Decomposition", IEEE Transactions of Industry Applications, vol. 29, No. 5, Sep./Oct. 1993, pp. 882-886.

Jivotov, V. et al, "Energy Cost of Plasmachemical Hydrogen from Hydrogen Sulfide is Actually Not More than About One kWh Per Cubic Meter", Int. Journal of Hydrogen Energy 24 (199) pp. 83-84.

Kajiwara, M. et al, "Stability and Hydrogen Permeation Behavior of Supported Platinum Membranes in Presence of Hydrogen Sulfide", Int. Jour. Of Hydrogen Energy 24 (1999) pp. 839-844.

Kaloidas, V. et al, "Kinetics of Thermal, Non-Catalytic Decomposition of Hydrogen Sulphide", Chem. Eng. Science, vol. 44, No. 11, pp. 2493-2500, 1989.

Livshits, A.I. et al, "Superpermeability of Solid Membranes and Gas Evacuation, Part I. Theory", Vacuum, vol. 29, No. 3, pp. 103-112 1978.

Livshits, A.I. et al, "Superpermeability of Solid Membranes and Gas Evacuation, Part II. Permeation of Hydrogen Through a Palladium Membrane Under Different Gas and Membrane Boundary Conditions", Vacuum, vol. 29, No. 3, pp. 113-124, 1978.

Livshitz, A.I., "Physico-Chemical Origin of Superpermeability—Large-Scale Effects of Surface Chemistry on "Hot" Hydrogen Permeation and Absorption in Metals", Jour. of Nuclear Materials 170 (1990) 79-84.

Palumbo, Francis J. et al, "Note on The Removal of Sulfur from Stack Gases by an Electrical Discharge", Jour. of Air Pollution. Control. Assn., pp.143-144 1971.

Livshits, A.I. et al, "Superpermeability to Fast and Thermal Hydrogen Particles: Applications to the Pumping and Recycling of Hydrogen Isotopes", Jour. of Nuclear Materials 196-198 (1992) pp. 159-163.

Livshits, A.I. et al, "Interactions of Low Energy Hydrogen Ions with Niobium: Effects of Non-Metallic Overlayers on Reemission, Retention and Permeation", Jour. of Nuclear Materials, 233-237 (1996) pp. 1113-1117.

Livshits, A.I. et al, "Superpermeability: Critical Points for Applications in Fusion", Jour. of Nuclear Materials 220-222 (1995) pp. 259-263.

Livshits, A.I. et al, "Applications of Superpermeable Membranes in Fusion: The Flux Density Problem and Experimental Progress", Jour. of Nuclear Materials 241-243 (1997) pp. 1203-1209.

Livshits, A.I. et al, "Plasma Driven Superpermeation of Hydrogen Through Group Va Metals", Jour. of Applied Physics, vol. 84, No. 5, 1998, pp. 2558-2564.

Nakamura, Y. et al, "Nb Interaction With Hydrogen Plasma", Jour. of Applied Physics, vol. 89, No. 1, 2001, pp. 760-766.

Notkin, M.E. et al, Effect of Ion Bombardment of Plasma-Driven Superpermeation of Hydrogen Isotopes Through a Niobium Membrane, Nuclear Instruments and Methods in Physics Research B 179 (2001) pp. 373-382.

Pick, M.A. et al, "Enhancement of Hydrogen Uptake Rates for Nb and Ta by Thin Surface Overlayers", Physical Review Letters, vol. 43, No. 4, 1979, pp. 286-289.

Pick, M.A. et al, "A Model for Atomic Hydrogen-Metal Interactions—Application to Recycling, Recombination and Permeation", Jour. of Nuclear Materials 121 (1985) pp. 208-220.

Pick, Michael A., "The Dependence of the Hydrogen Concentration in Metals on the Surface of Impurities", Jour. of Nuclear Materials 145-147 (1987) pp. 297-300.

Rothenberger, Kurt S. et al, Evaluation of Tantalum-Based Materials for Hydrogen Separation at Elevated Temperatures and Pressures, Jour. of Membrane Science 218 (2003) pp. 19-37.

Shu, J. et al, "Catalytic Palladium-Based Membrane Reactors: A Review", Canadian Jour. of Chem. Eng., vol. 69, 1991, pp. 1036-1060.

Sobczynski, Andrzej et al, "Tungsten Disulfide: A Novel Hydrogen Evolution Catalyst for Water Decomposition", J. Phys. Chem. 1988, 92, pp. 2311-2315.

Sobczynski, Andrzej, "Molybdenum Disulfide as a Hydrogen Evolution Catalyst for Water Photodecomposition on Semiconductors", Jour. of Catalysis 131 (1991) pp. 156-166.

Trauss, I. et al, "Hydrogen Sulfide Dissociation in Ozonizer Discharges and Operation of Ozonizers at Elevated Temperatures", Plasma Chemistry and Plasma Processing, vol. 12, No. 3, 1992, pp. 275-285.

Traus, I. et al, "Application of a Rotating High-Pressure Glow Discharge for the Dissociation of Hydrogen Sulfide", Plasma Chemistry and Plasma Processing, vol. 13, No. 1 1993, pp. 77-91.

Zaman, J. et al, "Production of Hydrogen and Sulfur from Hydrogen Sulfide", Fuel Processing Technology 41 (1995), pp. 159-198.

Zaman, J. et al, "A Simulation Study on the Thermal Decomposition of Hydrogen Sulfide in a Membrane Reactor", Int. J. Hydrogen Energy, vol. 20, No. 1, pp. 21-28, 1995.

Zelanski, Catherine M. et al, "Template Synthesis of Near-Monodisperse Microscale Nanofibers and Nanotubules of $MoS_2$", J. Am. Chem. Soc. 1998, 120, pp. 734-742.

* cited by examiner

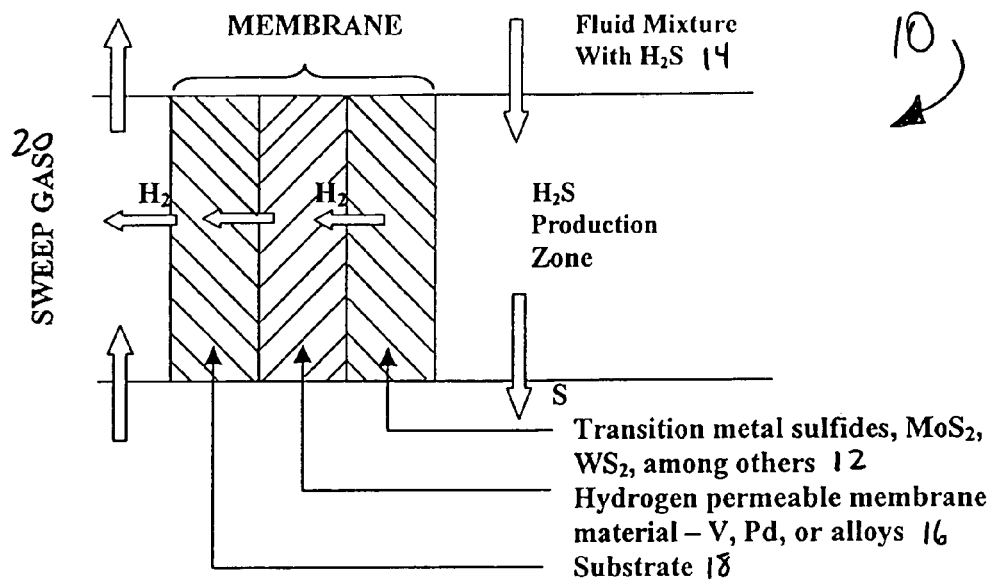
Figure 1. Configuration of the composite membrane
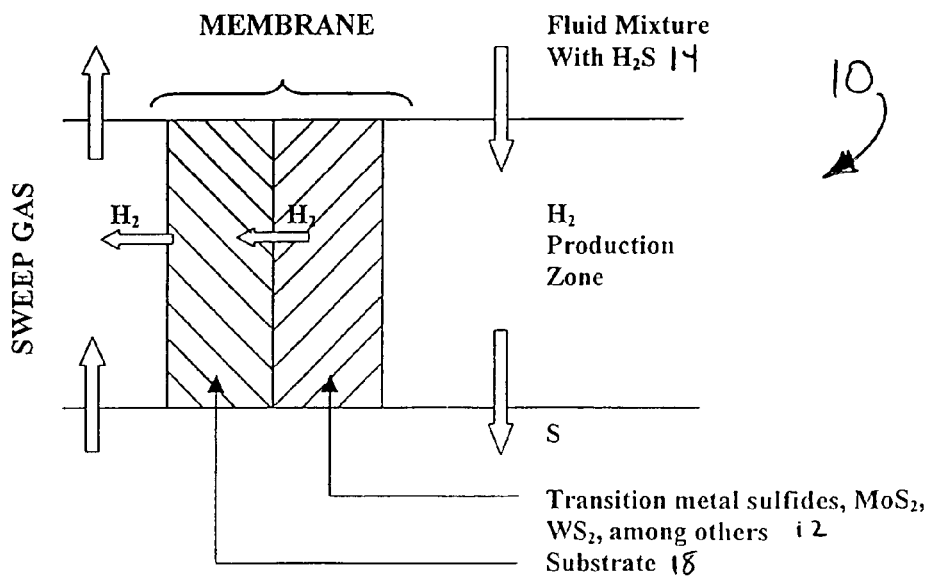
Figure 2. Optional configuration of the composite membrane

MEMBRANE FOR HYDROGEN RECOVERY FROM STREAMS CONTAINING HYDROGEN SULFIDE

CROSS REFERENCE TO RELATED APPLICATIONS

This application is a continuation of and claims benefit of priority of PCT Patent Application No. PCT/US2003/17353, filed Jun. 2, 2003, and U.S. Provisional Application No. 60/385,520 filed Jun. 4, 2002.

CONTRACTUAL ORIGIN OF INVENTION

This invention was made with U.S. Government support under Contract No. DE-FC02-91ER75680 awarded by the U.S. Department of Energy. The U.S. Government has certain rights in this invention.

BACKGROUND OF THE INVENTION

1. Field of the Invention

This invention relates generally to a membrane for hydrogen recovery from streams containing hydrogen sulfide and, more particularly, the invention relates to a membrane for hydrogen recovery from streams containing hydrogen sulfide which contain transition metal sulfides having resistance to sulfur compounds such as $H_2S$, the ability to catalyze the decomposition of $H_2S$ at moderate temperatures, the ability to catalyze the photochemical decomposition of water, and thus $H_2S$, to hydrogen at room temperatures, and the ability to adsorb hydrogen.

2. Description of the Prior Art

Most industrial processes for the recovery of sulfur from streams containing hydrogen sulfide are based on the Claus process. This entails partial combustion of $H_2S$, which is stripped, for example, from a sour natural gas stream, or from the effluent of a hydrodesulfurization unit in an oil refinery, to form $SO_2$. Elemental sulfur is recovered by reacting the remaining $H_2S$ with $SO_2$. Thermodynamic constraints limit the conversion (to about 0.7) of $H_2S$ and, hence, the thermal recovery of elemental sulfur from the Claus furnace (operated at around 2400° F.). The effluent gases from the Claus furnace are cooled to recover sulfur and then contacted over a catalyst bed at lower temperatures to increase the efficiency of sulfur recovery. For optimum operation, the composition of the gases in the Claus process must be maintained such that the $H_2S/SO_2$ ratio is 2:1. Even after several conversion stages, 2000–3000 ppm of $H_2S$ and $SO_2$ may remain in the effluent gas from the Claus process. An additional tail-gas cleanup unit (TGCU), which could cost roughly as much, and up to three times more than the Claus unit, depending on the size of the plant and sulfur recovery required—has to be used to ensure that the final overall sulfur recovery exceeds ninety-nine (99%) percent.

A major disadvantage, besides limited sulfur recovery, of the Claus process is that the energy contained in the hydrogen sulfide is lost. The economics of handling many sour-gas wells and $H_2S$-containing streams could be improved if the hydrogen sulfide could be effectively split into hydrogen and sulfur. The hydrogen would then be:

recycled to the refinery for use in hydrogenation applications; and used as a clean fuel in a fuel cell, or in direct combustion applications.

However, the direct thermal decomposition of $H_2S$ to produce hydrogen and sulfur also suffers from limitations imposed by slow reaction rates, even at high temperatures. Thus, the conversion is only a few percent at 800° C., and temperatures in excess of 2000° C. are required for complete thermolysis. The corrosive (and toxic) nature of $H_2S$ imposes additional limitations on high-temperature materials that may be used.

An alternative is to use catalysts that enhance the $H_2S$-decomposition rates. For example, sulfided transition metals and their mixtures have been found to be effective. More than ninety-five (95%) percent conversion of $H_2S$ was reported with molybdenum disulfide ($MoS_2$) at 800° C. with continuous removal of sulfur and intermittent removal of hydrogen. The role of the sulfides of chromium, cobalt, nickel, and iron has also been investigated; chromium sulfide exhibited stabilized activity. In all these cases, the total residence time in the reactor required to achieve the high conversions is of the order of hours. This, of course, limits large-scale practical application.

Another option is the use of membrane (catalytic, or non-catalytic) reactors. Many applications in the petroleum refineries have the potential to benefit from use of membranes that provide selective permeation of hydrogen. Besides providing a readily used, relatively pure hydrogen stream, this configuration also permits overcoming of (closed system) equilibrium conversion limitations. A severe constraint in terms of the application to $H_2S$-containing streams is that membrane materials; for example, palladium and/or its alloys that have been found effective for hydrogen permeation lose their catalytic activity, capability for hydrogen sorption, permeability, and structural integrity.

The use of membrane reactors for $H_2S$ decomposition is known. Relatively small enhancements in equilibrium conversion, from six (6%) percent to twelve (12%) percent at 800° C., have been found using a ceramic (quartz) membrane reactor walls. Close to one hundred (100%) conversion of 1.5% $H_2S$ at 115 psia using dense (metallic) membrane reactor walls has also been found. Key to achieving this result was a $H_2$-permeable composite membrane formed by deposition of a sulfur-resistant platinum coating on hydrogen-permeable vanadium on the feed side. Others have confirmed that a platinum-coated membrane is structurally satisfactory at high temperatures of interest, its permeability drops considerably after only a short period of operation. Therefore, unfortunately, the use of palladium-coated membranes in these studies led to rupture, and material failure.

SUMMARY

The present invention is a membrane for hydrogen recovery from streams containing hydrogen sulfide. The membrane comprises a substrate, a hydrogen permeable first membrane layer deposited on the substrate, and a second membrane layer deposited on the first layer. The second layer contains sulfides of transition metals and positioned on the on a feed side of the hydrogen sulfide stream.

In addition, the present invention includes a membrane for hydrogen recovery from streams containing hydrogen sulfide with the hydrogen sulfide composed of at least hydrogen and sulfur. The membrane comprises a substrate layer and a metal sulfide layer deposited on the substrate creating a membrane layer wherein the hydrogen sulfide stream contacts the membrane layer with the hydrogen only traveling through the membrane layer.

The present invention further includes a method for the direct decomposition of hydrogen sulfide to hydrogen and sulfur. The method comprises providing a membrane layer having sulfides of transition metals deposited thereon, directing a hydrogen sulfide stream toward the membrane layer, moving the hydrogen only through the membrane layer, and moving the sulfur only away from the membrane layer.

BRIEF DESCRIPTION OF THE DRAWINGS

FIG. 1 is a schematic view illustrating the configuration of the composite membrane, constructed in accordance with the present invention; and FIG. 2 is a schematic view illustrating another embodiment of the configuration of the composite membrane, constructed in accordance with the present invention.

DETAILED DESCRIPTION OF THE PREFERRED EMBODIMENTS

Direct decomposition of hydrogen sulfide to hydrogen and sulfur is limited by low reaction rates even at high temperatures. Higher conversions may be achieved through use of membrane reactors that remove hydrogen (and/or other products) from the reaction zone. However, conventional hydrogen permeable-selective membranes lose their catalytic activity, permeability, as well as structural integrity in the presence of sulfur-containing compounds.

Therefore, the present application describes a novel composite membrane, indicated generally at 10. As illustrated in FIGS. 1 and 2, the membrane 10 of the present application consists of layer(s) 12 of sulfides of transition metals, in particular molybdenum and tungsten, on the feed side of a hydrogen sulfide stream 14. The layer(s) 12 can be deposited on a thin layer 16 of conventional hydrogen permeable-selective materials such as palladium, platinum, vanadium, niobium, tantalum, or their alloys. These layers 16, in turn, are deposited on a substrate 18, either polymeric, inorganic, ceramic or metallic, that provides structural support suitable for use of the composite membrane 10 in industrial applications.

Still referring to FIGS. 1 and 2, the present invention are membranes 10 consisting of one layer 12 or two layers 12, 16 deposited on a substrate 18, either polymeric, inorganic, ceramic or metallic, that provides structural support suitable for use of the composite membrane 10 in industrial applications.

The first membrane layer 12, in contact with the reactive environment or the $H_2S$-containing (or other sulfur compounds) fluid stream 14, is preferably composed of transition metal sulfides, in particular tungsten or molybdenum sulfide or mixtures thereof. The sulfides can be impregnated with other transition metals that enhance these properties. These sulfides have the following desirable properties:

resistance to sulfur compounds such as $H_2S$;

ability to catalyze the decomposition of $H_2S$ at moderate temperatures;

ability to catalyze the photochemical decomposition of water, and thus $H_2S$, to hydrogen at room temperatures. This property is enhanced in the presence of electron donors; and ability to adsorb hydrogen; perhaps because of the nanotubular structures that may be formed.

It is relevant that some of these properties are enhanced in the presence of electron donors and/or irradiation. This is significant for reactors that may employ non-thermal plasmas, such as corona or silent barrier discharges to facilitate decomposition of $H_2S$. In these reactors, the intense luminosity of the streamers, and electron avalanches are expected to significantly enhance decomposition. The hydrogen adsorption ability will move the decomposition to higher conversions or completion.

The next membrane layer 16, sandwiched between the sulfide layer and the substrate, is a conventionally acceptable hydrogen-permeable material such as palladium, vanadium, among others, and alloys thereof. The purpose of this layer 16 is to abstract the hydrogen from the sulfide layer and to transmit, under the action of a concentration gradient, the hydrogen across the substrate 18, using a sweep gas 20 on the permeate side, if necessary, as illustrated in FIG. 1.

In an alternative embodiment, depending on the operating temperature and other conditions, the metal sulfide layer 12 can be directly deposited on the substrate 18, as illustrated in FIG. 2.

The composite membranes 10 described have the following advantages:

simple to synthesize using chemical vapor deposition, electrolytic plating, and other chemical synthesis routes;

effective for permeation, and removal, of hydrogen from reaction zones wherein $H_2S$ from process streams undergoes decomposition; and effective for permeation, and removal, of hydrogen from reaction zones, involving synthesis or treatment of hydrocarbon and other process streams, wherein the fluid stream contains $H_2S$.

Of particular relevance is the enhancement of desirable properties of the membrane 10 in applications involving non-thermal plasmas such as corona or silent barrier discharges to facilitate decomposition of $H_2S$. In these reactors, the intense luminosity of the streamers, and electron avalanches are expected to significantly enhance photolytic decomposition. The hydrogen adsorption ability will move the decomposition to higher conversions or completion.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A membrane for hydrogen recovery from streams containing hydrogen sulfide, the membrane comprising:
   a substrate;
   a hydrogen permeable first membrane layer deposited on the substrate; and
   a second membrane layer deposited on the first layer, the second layer containing sulfides of transition metals and positioned on the on a feed side of the hydrogen sulfide stream.

2. The membrane of claim 1 wherein the substrate is selected from the group consisting of polymeric, inorganic, ceramic, and metallic.

3. The membrane of claim 1 wherein the hydrogen permeable first layer is selected from the group consisting of palladium, palladium alloys, platinum, platinum alloys, vanadium, niobium, and tantalum.

4. The membrane of claim 1 wherein the sulfides of transition metals of the second layer are selected from the group consisting of molybdenum sulfide and tungsten sulfide.

5. The membrane of claim 1 wherein the sulfides of transition metals of the second layer are impregnated with transition metals.

6. The membrane of claim 1 and further comprising:
   means for facilitating decomposition of $H_2S$.

7. The membrane of claim 6 wherein the facilitating means are non-thermal plasmas selected from the group consisting of corona or silent barrier discharges.

8. A method for the direct decomposition of hydrogen sulfide to hydrogen and sulfur, the method comprising:
   providing a membrane layer having sulfides of transition metals deposited thereon;
   directing a hydrogen sulfide stream toward the membrane layer;
   moving the hydrogen only through the membrane layer; and
   moving the sulfur only away from the membrane layer.

9. The method of claim 8 wherein the sulfides of transition metals are selected from the group consisting of molybdenum sulfide and tungsten sulfide.

10. The method of claim 8, wherein the membrane layer includes a substrate layer and a metal sulfide layer deposited on the substrate, and further comprising:
    a hydrogen permeable layer deposited on the substrate between the substrate layer and the metal sulfide layer.

11. The method of claim 10 wherein the hydrogen permeable layer is selected from the group consisting of palladium, palladium alloys, platinum, platinum alloys, vanadium, niobium, and tantalum.

12. The method of claim 8 and further comprising:
    means for facilitating decomposition of $H_2S$.

13. The method of claim 12 wherein the facilitating means are non-thermal plasmas selected from the group consisting of corona or silent barrier discharges.

14. A membrane for hydrogen recovery from streams containing hydrogen sulfide, the hydrogen sulfide composed of at least hydrogen and sulfur, the membrane comprising:
    a substrate layer; and
    a metal sulfide layer deposited on the substrate creating a membrane layer;
    wherein the metal sulfide layer includes sulfides of transition metals selected from the group consisting of molybdenum sulfide and tungsten sulfide; and
    wherein the sulfides of transition metals are impregnated with transition metals.

15. A membrane for hydrogen recovery from streams containing hydrogen sulfide, the hydrogen sulfide composed of at least hydrogen and sulfur, the membrane comprising:
    a substrate layer;
    a metal sulfide layer deposited on the substrate creating a membrane layer; and
    a hydrogen permeable layer deposited on the substrate between the substrate layer and the metal sulfide layer.

16. The membrane of claim 15 wherein the hydrogen permeable layer is selected from the group consisting of palladium, palladium alloys, platinum, platinum alloys, vanadium, niobium, and tantalum.

* * * * *